United States Patent [19]

Inagawa

[11] Patent Number: 5,413,404
[45] Date of Patent: May 9, 1995

[54] METHOD FOR DETECTING TROUBLE IN FLUID PRESSURE SYSTEM AND FLUID PRESSURE BRAKE SYSTEM FOR VEHICLE

[75] Inventor: Shinichi Inagawa, Wako, Japan

[73] Assignee: Honda Giken Kogyo Kabushiki Kaisha, Tokyo, Japan

[21] Appl. No.: 209,857

[22] Filed: Mar. 14, 1994

[30] Foreign Application Priority Data

Apr. 14, 1993 [JP] Japan .................. 5-087610

[51] Int. Cl.$^6$ .................. B60T 13/18; B60T 17/22; B60Q 1/00
[52] U.S. Cl. .................. 303/92; 188/1.11; 303/DIG. 4; 340/451; 340/452
[58] Field of Search .................. 188/1.11; 303/10, 11, 303/92, DIG. 4, 116.1–116.4, DIG. 3; 73/4 R, 121, 118.1, 39; 340/451, 452; 417/38

[56] References Cited

U.S. PATENT DOCUMENTS

| | | | |
|---|---|---|---|
| 3,866,980 | 2/1975 | Eisele et al. | 340/453 X |
| 3,948,568 | 4/1976 | Leiber | 303/92 |
| 4,083,032 | 4/1978 | Nakamura et al. | 340/452 |
| 4,156,864 | 5/1979 | Ingram | 340/452 |
| 4,297,081 | 10/1981 | Irvin | 417/38 X |
| 4,566,309 | 1/1986 | van Belzen et al. | 73/4 R |
| 4,708,225 | 11/1987 | Feldman et al. | 188/1.11 E |
| 4,802,710 | 2/1989 | Burgdorf et al. | 303/92 X |
| 4,869,558 | 9/1989 | Yoshino | 303/DIG. 4 X |
| 5,236,254 | 8/1993 | Muller et al. | 188/1.11 E |

FOREIGN PATENT DOCUMENTS

| | | | |
|---|---|---|---|
| 247934 | 11/1986 | Japan | 73/4 R |
| 4243655 | 8/1992 | Japan | 188/1.11 E |

*Primary Examiner*—Robert J. Oberleitner
*Assistant Examiner*—Alfred Muratori
*Attorney, Agent, or Firm*—Armstrong, Westerman, Hattori, McLeland & Naughton

[57] ABSTRACT

A method for detecting trouble in a fluid pressure system which has a fluid pressure source including a fluid pump, a pressure tank connected to the pump, a pressure detector for detecting fluid pressure in the pressure tank, and a control device for controlling the operation of the fluid pump on the basis of an output signal from the pressure detector, comprising the steps of operating such fluid pressure systems with output fluid pressure from the fluid pressure source, detecting variation in the output signal from the pressure detector and when the output signal is less than a first predetermined value during operation of the fluid pressure system driving said fluid pump regardless of the output signal from the pressure detector, and when the variation in output signal from the pressure detector is less than a second predetermined value as a result of such driving of said fluid pump energizing a signal to indicate that the system is out of order. During operation of said system, monitoring the fluid pressure detected by said pressure detector for reliably and accurately detecting trouble in the system.

2 Claims, 8 Drawing Sheets

METHOD FOR DETECTING TROUBLE IN FLUID PRESSURE SYSTEM AND FLUID PRESSURE BRAKE SYSTEM FOR VEHICLE

BACKGROUND OF THE INVENTION

1. Field of the Invention

The present invention relates to a method for detecting trouble in a fluid pressure system which includes a fluid pressure source having a fluid pump, a pressure tank connected to the pump, a pressure detector for detecting a fluid pressure in the pressure tank, and a control means for controlling the operation of the fluid pump on the basis of an output signal from the pressure detector, and which is operated by an output pressure from the fluid pressure source, and to methods for detecting trouble in a fluid pressure brake system which comprises a fluid pressure source including a fluid pump, a pressure tank connected to the pump, a pressure detector for detecting a fluid pressure in the pressure tank, and a control means for controlling the operation of the fluid pump on the basis of an output signal from the pressure detector, and which controls the output pressure from the fluid pressure source to a fluid pressure corresponding to an operation quantity to deliver it.

2. Description of the Prior Art

Such fluid pressure systems and such fluid pressure brake systems for vehicles are already known, for example, from Japanese Patent Application Laid-open No. 274958/92 and the like.

In such a system, if the pressure detector gets out of order, or if a defect in fluid pressure is produced in the middle of a fluid pressure path, a sufficient fluid pressure cannot be insured in the fluid pressure source. Thereupon, a technique for detecting trouble in the pressure detector is disclosed in Japanese Patent Application Laid-open No. 345568/92. This prior art technique is intended to detect a high or low level sticking state of the pressure detector on the basis of an output signal from the pressure detector, but is incapable of detecting a trouble at an intermediate level between high and low levels and is also incapable of detecting a defect in fluid pressure produced in the middle of the fluid pressure path.

On the basis of the fact that, if the system is normal, the fluid pressure is varied in accordance with the operation of the system, the trouble will be detected, if the consumption of fluid pressure is monitored during operation of the system.

SUMMARY OF THE INVENTION

Accordingly, it is an object of the present invention to provide a method for detecting trouble, wherein the consumption of fluid pressure is monitored, so that the trouble of the system can be detected reliably and accurately.

To achieve the above object, according to a first aspect and feature of the present invention, there is provided a method for detecting trouble in a fluid pressure system comprising a fluid pressure source including a fluid pump, a pressure tank connected to the pump, a pressure detector for detecting a fluid pressure in the fluid tank, and a control means for controlling the operation of the fluid pump on the basis of an output signal from the pressure detector. The system is operated by an output pressure from the fluid pressure source, wherein, when an amount of variation in the output signal from the pressure detector is less than a first predetermined value during operation of the fluid pressure system, the fluid pump is forcedly driven regardless of the output signal from the pressure detector. As a result of such forced driving of the fluid pump, if the amount of variation in the output signal from the pressure detector is less than a second predetermined value, it is decided that there is trouble.

With the above feature, from the fact that the variation in detected fluid pressure value is smaller in a condition in which the detected fluid pressure value must be varied if the fluid pressure system is normal, it can be decided that the system is out of order. This provides a high accuracy decision of trouble.

In addition, according to a second aspect and feature of the present invention, there is provided a method for detecting trouble in a fluid pressure brake system for a vehicle comprising a fluid pressure source including a fluid pump, a pressure tank connected to the pump, a pressure detector for detecting a fluid pressure in the fluid tank, and a control means for controlling the operation of the fluid pump on the basis of an output signal from the pressure detector. The system controls the output pressure from the fluid pressure source to a fluid pressure corresponding to an operation quantity to output the same, wherein, when an amount of variation in the output signal from the pressure detector is less than a predetermined value in a condition in which an amount of variation in longitudinal motion parameter of a vehicle exceeds a preset value, during operation of the fluid pressure brake system, it is decided that there is trouble.

With the above feature, if the fluid pressure brake system is normal, the detected fluid pressure value must be varied in proportion to the consumption of fluid pressure as a result of the variation in longitudinal vehicle-motion parameter being equal to or more than the predetermined value. From the fact that the variation in detected fluid pressure value is smaller in such a condition, it can be decided that the fluid pressure brake system is out of order. This provides a high accuracy decision of trouble.

The above and other objects, features and advantages of the invention will become apparent from the following description of preferred embodiments, taken in conjunction with the accompanying drawings.

DESCRIPTION OF THE PREFERRED EMBODIMENTS

The present invention will now be described by way of a first embodiment applied to a liquid pressure brake system for a vehicle in connection with the accompanying drawings.

Figure 1:
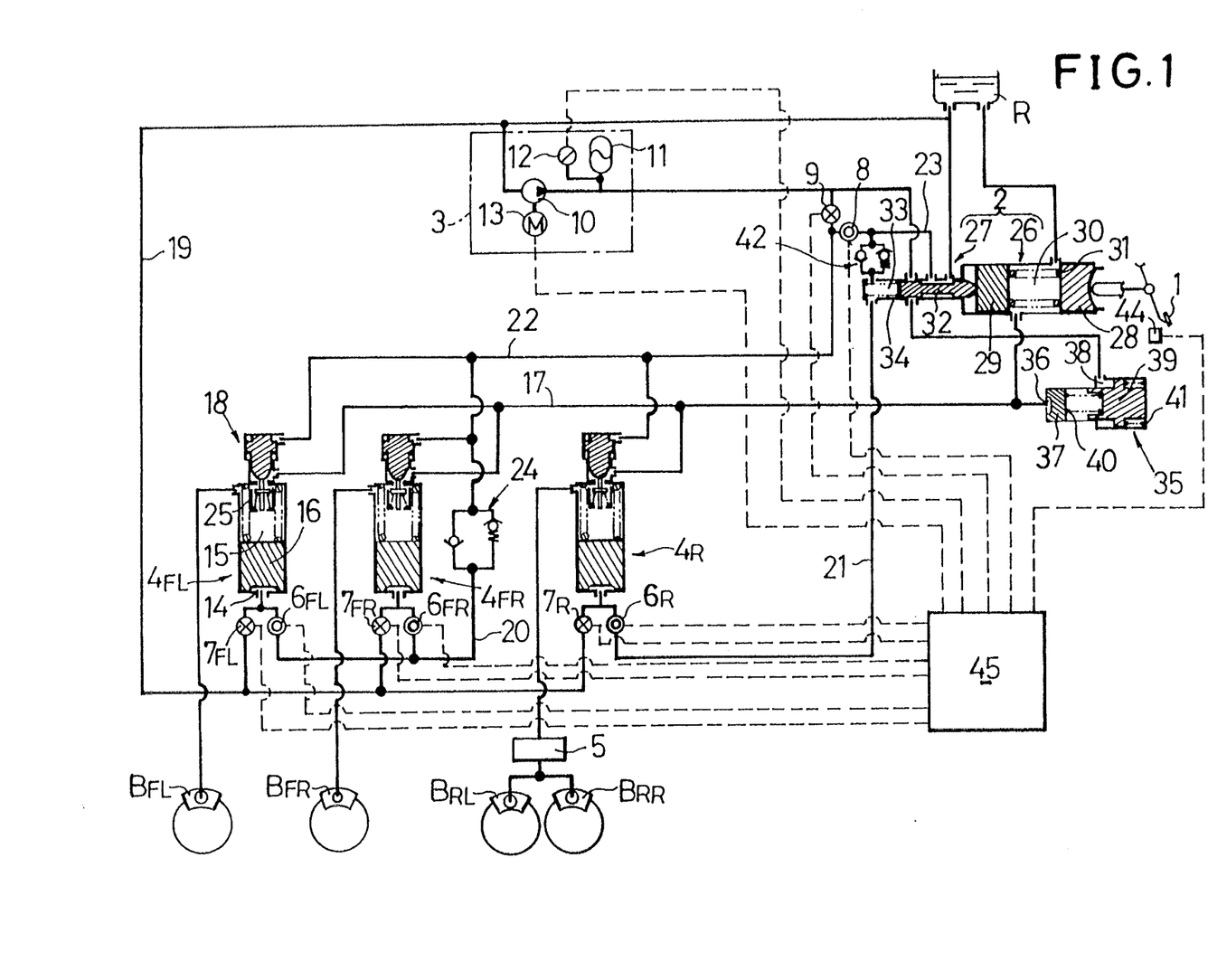
FIG. 1 is a diagram illustrating an arrangement of a fluid pressure brake system for a vehicle according to a first embodiment of the present invention.

Referring first to FIG. 1, a left front wheel brake device $B_{FL}$ and a right front wheel brake device $B_{FR}$ are mounted to left and right front wheels as driven wheels of the vehicle, respectively, and a left rear wheel brake device $B_{RL}$ and a right rear wheel brake device $B_{RR}$ are mounted to left and right rear wheels as follower wheels, respectively. A liquid pressure control device 2 is connected to a brake pedal 1 and is capable of controlling the output pressure from a liquid pressure source 3 as a fluid pressure source in accordance with the quantity of brake pedal 1 depressed and is capable of delivering a liquid pressure, corresponding to the quantity of brake pedal 1 depressed, when the output pressure from the liquid pressure source 3 has been reduced abnormally. During a normal braking, when the output liquid pressure from the liquid pressure source 3 is normal, an amplified liquid pressure, delivered from the liquid pressure control device 2, is supplied through liquid pressure transferring units $4_{FL}$ and $4_{FR}$ to the front wheel brake devices $B_{FL}$ and $B_{FR}$, and an amplified liquid pressure from the liquid pressure control device 2 is supplied, through a liquid pressure transferring unit $4_R$ and a proportional reduction valve 5 to the rear wheel brake devices $B_{RL}$ and $B_{RR}$. When the output liquid pressure from the liquid pressure source 3 has been reduced abnormally, a non-amplified liquid pressure, delivered from the liquid pressure control device 2 in correspondence with the quantity of brake pedal 1 depressed, is supplied through the liquid pressure transferring units $4_{FL}$ and $4_{FR}$ to the front wheel brake devices $B_{FL}$ and $B_{FR}$, and is also supplied through the liquid pressure transferring unit $4_R$ and the proportional reduction valve 5 to the rear wheel brake devices $B_{RL}$ and $B_{RR}$. Further, braking liquid pressures for the brake devices $B_{FL}$, $B_{FR}$, $B_{RL}$ and $B_{RR}$ can be maintained, or reduced, by inlet valves $6_{FL}$ and $6_{FR}$ and outlet valves $7_{FL}$ and $7_{FR}$, individually corresponding to the front wheel brake devices $B_{FL}$ and $B_{FR}$, and an inlet valve $6_R$ and an outlet valve $7_R$, which are common to the rear wheel brake devices $B_{FR}$ and $B_{RR}$, thereby effecting an anti-lock control. By controlling the opening and closing of a normally-opened solenoid valve 8 and a normally-closed solenoid valve 9, used for a traction control, braking liquid pressures for the front wheel brakes $B_{FL}$ and $B_{FR}$ can be increased to effect traction control.

The liquid pressure source 3 includes a liquid pump 10 as a fluid pump for pumping of a positive pressure working fluid from a reservoir R, a pressure tank 11 (an accumulator in this embodiment) connected to the liquid pump 10, and a pressure detector 12 for detecting a liquid pressure in the pressure tank 11. A motor 13 is connected to the liquid pump 10.

The liquid pressure transferring units $4_{FL}$, $4_{FR}$ and $4_R$ basically have the same construction and hence, only the construction of typical one of them, i.e., the liquid pressure transferring unit $4_{FL}$, will be described below.

The liquid pressure transferring unit $4_{FL}$ includes a free piston 16 axially slidably disposed therein, whose opposite ends face an input liquid pressure chamber 14 and an output liquid pressure chamber 15, respectively, and which is biased by a spring toward the input liquid pressure chamber 14. A bypass valve 18 is interposed between the output liquid pressure chamber 15 and a passage 17 and is capable of blocking the communication between the passage 17 and the output liquid pressure chamber 15, as the liquid pressure in a passage 22 is increased, but permitting the passage 17 and the output liquid pressure chamber 15 to communicate with each other, as the pressure in the passage 22 is reduced. A forcedly opening means 25 is provided between the free piston 16 and the bypass valve 18 for forcedly opening the bypass valve 18 in response to an over-stroke of the free piston 16 due to an abnormal increase in quantity of liquid pressure consumed in the brake device $B_{FL}$.

Liquid pressure transferring unit $4_{FL}$ ensures that a liquid pressure, corresponding to a liquid pressure applied to the input liquid pressure chamber 14 with the bypass valve 18 closed, can be delivered from the output liquid pressure chamber 15, and the working fluid in the output liquid pressure chamber 15 cannot flow toward the input liquid pressure chamber 14. In addition, with the bypass valve 18 opened, liquid pressure from the passage 17 can be guided to the output liquid pressure chamber 15 even in a condition in which no liquid pressure is applied to the input liquid pressure chamber 14.

The output liquid pressure chambers 15, in the liquid pressure transferring units $4_{FL}$ and $4_{FR}$, are independently connected to the brake devices $B_{FL}$ and $B_{FR}$, respectively. The output liquid pressure chamber 15, in the liquid pressure transferring unit 4R is connected, through the common proportional reduction valve 5, to the brake devices $B_{RL}$ and $B_{RR}$.

The inlet valves $6_{FL}$ and $6_{FR}$ and the outlet valves $7_{FL}$ and $7_{FR}$ are connected parallel to the input liquid pressure chambers 14 in the liquid pressure transferring units $4_{FL}$ and $4_{FR}$, corresponding to the front wheel brake devices $B_{FL}$ and $B_{FR}$, respectively. The inlet valves $6_R$ and the outlet valve $7_R$ are connected, parallel, to the input liquid pressure chamber 14 in the liquid pressure transferring unit $4_R$ corresponding to the rear wheel brake devices $B_{RL}$ and $B_{RR}$.

Each of the inlet valves $6_{FL}$, $6_{FR}$ and $6_R$ is a normally-opened solenoid valve which is closed by energization. Each of the outlet valves $7_{FL}$, $7_{FR}$ and $7_R$ is a normally-closed solenoid valve which is opened by energization. The outlet valves $7_{FL}$, $7_{FR}$ and $7_R$ are interposed between the inlet liquid pressure chambers 14, in the liquid pressure transferring units $4_{FL}$, $4_{FR}$ and $4_R$, and a release passage 19 leading to the reservoir R, respectively. The inlet valves $6_{FL}$ and $6_{FR}$ are interposed between the inlet liquid pressure chambers 14 in the liquid pressure transferring units $4_{FL}$ and $4_{FR}$ and a passage 20, respectively. The inlet valve $6_R$ is interposed between the inlet liquid pressure chamber 14 in the liquid pressure transferring unit $4_R$ and a passage 21.

The proportional reduction valve 5 has a conventionally well-known structure and functions to proportionally reduce the liquid pressure delivered from the output liquid pressure chamber 15 in the liquid pressure transferring unit $4_R$ to apply a reduced liquid pressure to the rear wheel brake devices $B_{RL}$ and $B_{RR}$.

The normally-opened solenoid valve 8 is interposed between the passages 22 and 23, and is capable of being switched over between a state in which it permits the communication between the passages 22 and 23, in its deenergized state, and a state in which it blocks the communication between the passages 22 and 23, in its energized state. The normally-closed solenoid valve 9 is interposed between the liquid pressure source 3 and the passage 22, and is capable of being switched over between a state in which it permits the communication between the liquid pressure source 3 and the passage 22, in its deenergized state, and a state in which it blocks the communication between the liquid pressure source 3 and the passage 22, in its energized state. During traction control, the solenoid valves 8 and 9 are energized.

A flow limiting means 24 is interposed between the passages 22 and 20 for permitting a flow of the working fluid from the passage 22 to the passage 20 in response to increasing of the liquid pressure in the passage 22 to a level larger than the liquid pressure in the passage 20 by a predetermined value, or more, and for permitting a flow of the working fluid from the passage 20 to the passage 22 in response to increasing of the liquid pressure in the passage 20 to a level slightly larger than the liquid pressure in the passage 22.

The flow limiting means 24 ensures that by blocking the flow of the working fluid from the passage 22 to the passage 20, leading to such input liquid pressure chamber 14 of each of the liquid pressure transferring units $4_{FL}$ and $4_{FR}$, until the bypass valve 18 in each of the liquid pressure transferring units $4_{FL}$ and $4_{FR}$ is closed, in response to an increase in liquid pressure in the passage 22 at an initial stage of braking operation, a braking pressure is applied to the input liquid pressure chamber 14 in each of the liquid pressure transferring units $4_{FL}$ and $4_{FR}$ after closing of each of the bypass valves 18 at an initial portion of a braking operation, and the working fluid in the passage 20 can be escaped to the reservoir R, when a braking operation force is released.

The liquid pressure control device 2 includes an auxiliary liquid pressure generating means 26, capable of generating a non-amplified liquid pressure corresponding to a force of braking operation by the brake pedal 1, and a control valve 27, capable of controlling the output pressure from the liquid pressure source 3, in accordance with the quantity of brake pedal 1 operated, to deliver an amplified liquid pressure.

The auxiliary liquid pressure generating means 26 includes an input piston 28 connected to the brake pedal 1, an urging piston 29, defining a liquid pressure chamber 30 between the urging piston 29 itself and the input piston 28, and a spring 31 compressed between the pistons 28 and 29.

The control valve 27 includes a spool 32 having a front end facing a reaction chamber 33 and a rear end against which the urging piston 29 abuts coaxially, and a return spring 34, in reaction chamber 33 applying a spring force in a direction to bring the spool 32 into abutment against the urging piston 29. The spool 32 is movable between an advanced position in which it permits the passage 23 to be in communication with the liquid pressure source 3, and a retreated position in which the passage 23 is in communication with the reservoir R. The reaction chamber 33 is connected to the passage 21.

A flow limiting means 42 is interposed between the passage 23 and the reaction chamber 33. This flow limiting means 42 permits a flow of the working fluid from the passage 23 to the reaction chamber 33, in response to increasing of the liquid pressure in the passage 23 to a level larger than the liquid pressure in the reaction chamber 33 by a predetermined value, or more, and permits a flow of the working fluid from the reaction chamber 33 to the passage 23 in response to increasing of the liquid pressure in the reaction chamber 33 to a level slightly larger than the liquid pressure in the passage 23.

The flow limiting means 42 acts to increase the liquid pressure delivered to the passage 23 to a certain value before an operation reaction force is produced at an initial stage of a braking operation, and inhibits the delivery of a liquid pressure to the passage 21, leading to the input liquid pressure chamber 14 in the liquid pressure transferring unit $4_R$, until the bypass valve 18 of the liquid pressure transferring unit $4_R$, by generating no liquid pressure in the reaction chamber 33 until the liquid pressure delivered from the control valve 27 of the liquid pressure control device 2 to the passage 23 at the initial portion of the braking operation reaches a certain value. Thus, at the initial portion of the braking operation, the liquid pressure in the passage 23 is applied to the input liquid pressure chamber 14 in the liquid pressure transferring unit $4_R$ after closing of the bypass valve 18 in the liquid pressure transferring unit $4_R$. When the braking operation force is released, the flow limiting means 42 acts to escape the working fluid in the passage 21 through the passage 23 via the control valve 27 to the reservoir R.

The passage 17 is connected to the liquid pressure chamber 30 in the auxiliary liquid pressure generating means 26, and a stroke accumulator 35 is connected to the passage 17.

The stroke accumulator 35 includes an accumulator piston 37 having a front end facing an accumulating chamber 36 leading to the passage 17, a backup piston 39, disposed in rear of the accumulator piston 37 and facing a pilot chamber 38 leading to the liquid pressure source 3, so that a liquid pressure in the pilot chamber 38 is applied rearwardly, an accumulator spring 40 compressed between the pistons 37 and 39, and a backup spring 41, for exhibiting a spring load larger than that of the accumulator spring 40 to resiliently bias the backup piston 39 in a direction to reduce the volume of the pilot chamber 38.

With such stroke accumulator 35, in a condition in which the liquid pressure source 3 is in a normal operation such that a normal liquid pressure from the liquid pressure source 3 is applied to the pilot chamber 38, the backup piston 39 is moved against a biasing force of the backup spring 41 in a direction to increase the volume of the pilot chamber 38. If the operation of the liquid pressure source is disordered to cause an abnormal reduction in liquid pressure in the pilot chamber 38, the backup piston 39 is moved in the direction to reduce the volume of the pilot chamber 38 by the action of the spring force of the backup spring 41, so that a larger spring load of the backup spring 41, in addition to the accumulator spring 40, is applied to the accumulator piston 37.

The function of such liquid pressure brake system for the vehicle will be described below. During a usual braking operation, in a condition in which the liquid pressure source 3 is in a normal operation, the inlet valves $6_{FL}$, $6_{FR}$ and $6_R$ and the outlet valves $7_{FL}$, $7_{FR}$ and $7_R$ are in their deenergized states. The normally-opened type solenoid valve 8 and the normally-closed type solenoid valve 9 are also in their deenergized states. Therefore, the passage 23, through which the amplified liquid pressure from the liquid pressure control device 2 is guided, has been put into communication with the passage 22, and has been connected from the passage 22 through the flow limiting means 24 to the input liquid pressure chambers 14 in the liquid pressure transferring units $4_{FL}$ and $4_{FR}$ and also through the flow limiting means 42 to the input liquid pressure chamber 14 in the liquid pressure transferring unit $4_R$.

If the brake pedal 1 is depressed in this condition, the input piston 28 in the liquid pressure control device 2 is advanced to provide an advancing force to the urging piston 29 through the spring 31, thereby causing the spool 32 of the control valve 27 to be advanced, while compressing the return spring 34. The advancement of the spool 32 causes the passage 23 to be put into communication with the liquid pressure source 3 and at the same time to be out of communication with the reservoir R, so that a liquid pressure in the reaction chamber 33, i.e., a liquid pressure for urging the spool 32 in a retreating direction, is not generated by the operation of the flow limiting means 42, until the output pressure of the passage 23 reaches a certain value, and a suddenly increased liquid pressure is delivered to the passage 23 at an initial stage of a braking operation. This causes the bypass valve 18 in each of the liquid pressure transferring units $4_{FL}$, $4_{FR}$ and $4_R$ to be closed, and then, a liquid pressure is applied from the passage 20 to the input liquid pressure chambers 14 in the liquid pressure transferring units $4_{FL}$ and $4_{FR}$ and also from the passage 20 to the input liquid pressure chamber 14 in the liquid pressure transferring unit $4_R$.

In the control valve 27, if a force in a retreating direction which is a sum of the spring force of the return spring 34 and a force resulting from the multiplication of a sectional area of the spool 32 by the liquid pressure in the reaction chamber 33 exceeds the spring load of the spring 31, the input piston 31 is advanced relative to the urging piston 29, while compressing the spring 31, thereby reducing the volume of the liquid pressure chamber 30 is reduced to generate a liquid pressure in the liquid pressure chamber 30.

Therefore, notwithstanding that the accumulating chamber 36 in the stroke accumulator 35, for insuring an operation stroke, is in communication with the liquid pressure chamber 30, an initial operation stroke cannot be absorbed by the stroke accumulator 35 to become a lost stroke.

Thereafter, the liquid pressure, in the liquid pressure chamber 30, is accumulated in the accumulating chamber 36 in the stroke accumulator 35, and the input piston 28 is further advanced by the action of an operation force opposing the urging force of the accumulator spring 40 acting on the accumulator piston 37. Thus, the operation stroke can be insured by the stroke accumulator 35.

After generation of the liquid pressure in the liquid pressure chamber 30, the spool 32 in the control valve 27 is moved forwardly and rearwardly, so that a force in the retreating direction from the side of the reaction chamber 33 is balanced with a force in an advancing direction from the side of the liquid pressure chamber 30. This controls the output pressure from the liquid pressure source 3, so that an amplified liquid pressure, corresponding to the quantity of brake pedal 1 depressed, is delivered from the liquid pressure control device 2 to the passage 23, whereby a braking force is provided in each of the brake devices $B_{FL}$, $B_{FR}$, $B_{FR}$ and $B_{RR}$ by the amplified liquid pressure.

When the depression force on the brake pedal 1 is excessively larger, during such braking, causing a wheel to be about to become locked, one of the inlet valves $6_{FL}$, $6_{FR}$ and $6_R$ corresponding to the wheel about to become locked is energized, thereby putting the passage and the liquid pressure transferring unit $4_{FL}$ or $4_{FR}$ out of communication with each other, or putting the passage 21 and the liquid pressure transferring unit $4_R$ out of communication with each other. Thus, an increase in braking force can be inhibited to prevent the wheel from becoming locked. If the wheel is still likely to be brought into a locked state, then the corresponding inlet valve $7_{FL}$, $7_{FR}$ or $7_R$ is energized, thereby putting the input liquid pressure chamber 14 in the liquid pressure transferring unit $4_{FL}$, $4_{FR}$ or $4_R$ into communication with the reservoir R to reduce the braking pressure. This makes it possible to eliminate the locking tendency of the wheel.

Suppose that the output pressure from the liquid pressure source 3 has been abnormally reduced due to a trouble of the liquid pump 10, or the like, during the above-described braking. In this case, the bypass valves 18 in the liquid pressure transferring units $4_{FL}$, $4_{FR}$ and $4_R$ are opened in response to a reduction in liquid pressure delivered from the liquid pressure control device 2 to the passage 23. Thus, a liquid pressure produced in the liquid pressure chamber 30 in response to the advancement of the input piston 28 by the depression of the brake pedal 1, is applied through the passage 17 and the bypass valves 18 to the front wheel brake devices $B_{FL}$ and $B_{FR}$ and also through the passage 17, the bypass valve 18 and the proportional reduction valve 5 to the rear wheel brake devices $B_{RL}$ and $B_{RR}$. Therefore, even in a condition in which the output pressure from the liquid pressure source 3 has been abnormally reduced, the liquid pressure generated in the liquid pressure in the auxiliary liquid pressure generating means 26 can be applied to the brake devices $B_{FL}$, $B_{FR}$, $B_{RL}$ and $B_{RR}$.

During this time, the liquid pressure in the pilot chamber 38 in the stroke accumulator 35 is reduced abnormally, whereby the backup piston 39 is advanced, thereby causing the spring force of the backup spring 41 having a larger spring load to act on the accumulator piston 37 in addition to the spring force of the accumulator spring 40. Thus, the liquid pressure produced in the liquid pressure chamber 30, as a result of abnormally reduction of the output pressure from the liquid pressure source 3, cannot be unnecessarily consumed in the stroke accumulator 35, and the stroke of depression of the brake pedal 1 cannot be increased more than necessary.

Further, if the driving force of the engine is excessively large during non-braking, causing the driven wheels to be about to become excessively slipped, the normally-opened type solenoid valve 8 and the normally-closed type solenoid valve 9 are energized. This causes the output liquid pressure from the liquid pressure source 3 to be applied to the input liquid pressure chambers 14 in the liquid pressure transferring units $4_{FL}$ and $4_{FR}$, so that a braking force is generated in the brake devices $B_{FL}$ and $B_{FR}$ for the left and right wheels which are the driven wheels, thereby avoiding the occurrence of the excessive slipping. Thereafter, the braking force can be controlled by controlling the energization and deenergization of the inlet valves $6_{FL}$ and $6_{FR}$ and the outlet valves $7_{FL}$ and $7_{FR}$, as during the above-described anti-lock control.

In such liquid pressure brake system for the vehicle, the energization and deenergization of the inlet valves $6_{FL}$ and $6_{FR}$, the outlet valves $7_{FL}$ and $7_{FR}$, the normally-opened type solenoid valve 8 and the normally-closed type solenoid valve 9 are controlled by a control means 45 comprising a computer, and the operation of the liquid pump 10 and, thus, the motor 13 in the liquid pressure source 3 is also controlled by the control means 45 in response to an output signal from the pressure detector 12.

If the pressure detector 12 in the liquid pressure source 3 gets out of order, or if a defect in liquid pressure should be produced in a liquid pressure path, it is feared that a reliable braking liquid pressure is not-provided and hence, it is necessary to promptly and reliably detect any trouble of the system. The control means 45 is capable of detecting the trouble of the liquid pressure brake system for the vehicle. To this end, a brake switch 44, serving as an operation detecting means for detecting the operation of the brake pedal 1 for operating the liquid pressure brake system, is connected to the control means 45.

In detection of a trouble of the liquid pressure brake system, a detecting procedure which will be described below is established in the control means 45.

Figure 2:
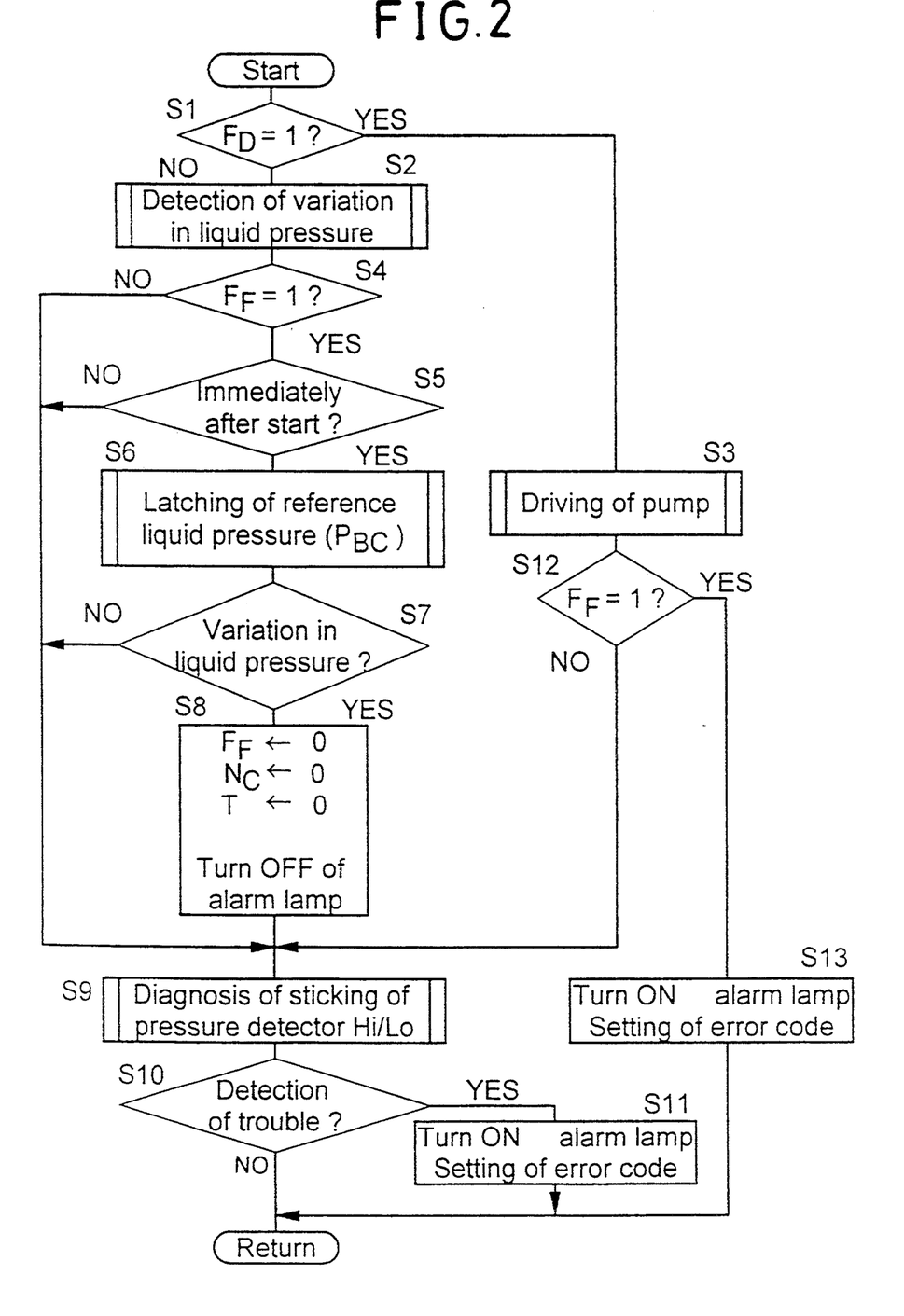
FIG. 2 is a flow chart illustrating a main routine for judgment of trouble.

First, at a first step S1 in FIG. 2, it is judged whether or not a flag $F_D$ is equal to "1". The flag $F_D$ is intended to demand the driving of the liquid pump 10, irrespective of a detection value detected by the pressure detector 12, in detecting the trouble of the liquid pressure brake system. $F_D=1$ indicates a state in which the driving of the liquid pump 10 is demanded. If $F_D=0$, then the processing is advanced to a second step S2, and on the other hand, if $F_D=1$, then the processing is advanced to a third step S3.

Figure 3:
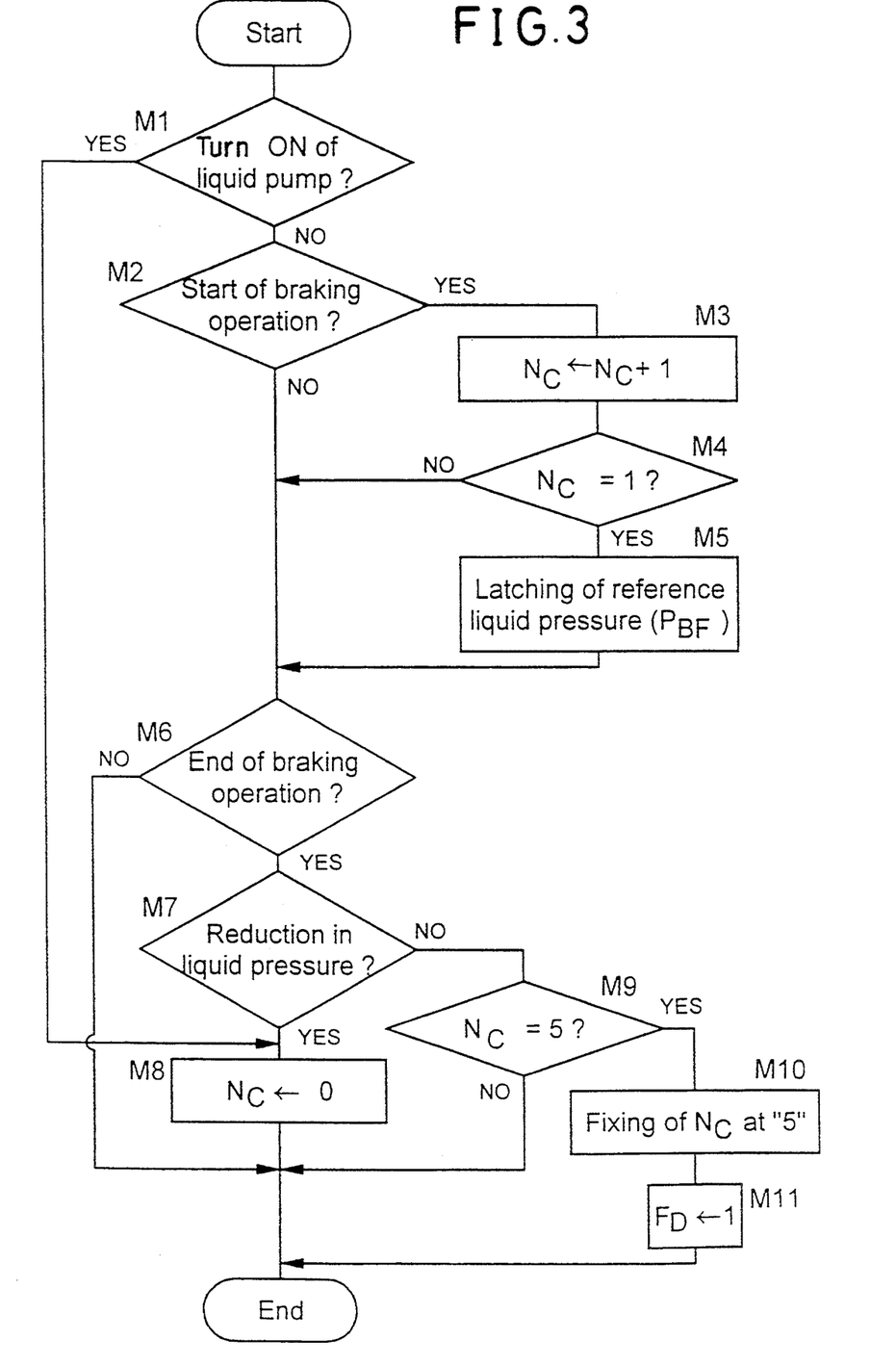
FIG. 3 is a flow chart illustrating a sub-routine for detection of a variation in fluid pressure.

At the second step S2, a variation in liquid pressure is detected according to a sub-routine shown in FIG. 3. At a first step M1 in this sub-routine, it is judged whether or not the liquid pump 10 is in operation. If it is decided that the liquid pump 10 is in operation, the count value Nc in a counter is set "0" at an eighth step MS. The counter is intended to count the number of braking operations.

If it is decided at the first step M1 that the liquid pump 10 is in non-operation, the processing is advanced to a second step M2, where it is judged whether or not the braking operation has been started, i.e., whether or not a detection signal of the brake switch 33 has been risen. At the start of the braking operation, one ("1") is added to the count value Nc at a third step M3. If it is decided at a next fourth step M4 that the count value Nc is equal to "1", i.e., that the braking operation is a first braking operation, then the now detected liquid pressure value is latched as a first reference liquid pressure $P_{BF}$ at a fifth step M5, progressing to a sixth step M6. Also if it is decided at the second step M2 that the braking operation is not started, as well as if it is decided at the fourth step S4 that Nc≠1, the processing is advanced to the sixth step M6.

At the sixth step M6, it is judged whether or not the braking operation has been ended, i.e., whether or not the detection signal of the brake switch 44 has been fallen. At the end of the braking operation, the processing is advanced to a seventh step M7. At the seventh step M7, it is judged whether or not the decrement in the detected liquid pressure value is equal to or more than a predetermined value $\Delta P_1$, e.g., 4 kg/cm². In other words, the first reference liquid pressure $P_{BF}$ latched at the fifth step M5 is compared with a detection liquid pressured P detected at the end of the braking operation. If $(P_{BF}-P) \geq \Delta P_1$, the processing is advanced to the eighth step M8. If $(P_{BF}-P) < \Delta P_1$, the processing is advanced to a ninth step M9.

At the ninth step M9, it is judged whether or not the count value Nc is equal to "5". If Nc=5, the count value Nc is fixed at "5" at a tenth step M10 and then, the flag $F_D$ is set at "1" at an 11th step M11.

According to such sub-routine shown in FIG. 3, the detected liquid pressure value at the start of the braking operation is stored as the first reference liquid pressure $P_{BF}$ during non-operation of the liquid pump 10, and when a condition in which the decrement in detected liquid pressure value during continuation of the braking operation is less than the first predetermined value $\Delta P_1$ as a result of the comparison of the detected liquid pressure P at the end of the braking operation with the first predetermined value $\Delta P_1$, has been continued five times or more, the flag $F_D$ for forcedly driving the liquid pump 10 is set at "1". That is, when a condition, in which a variation in output from the pressure detector 12 is less than the first predetermined value $\Delta P_1$, has been continued five times or more, irrespective of the consumption of liquid pressure as a result of the braking operation, the liquid pump 10 is forcedly driven.

Figure 4:
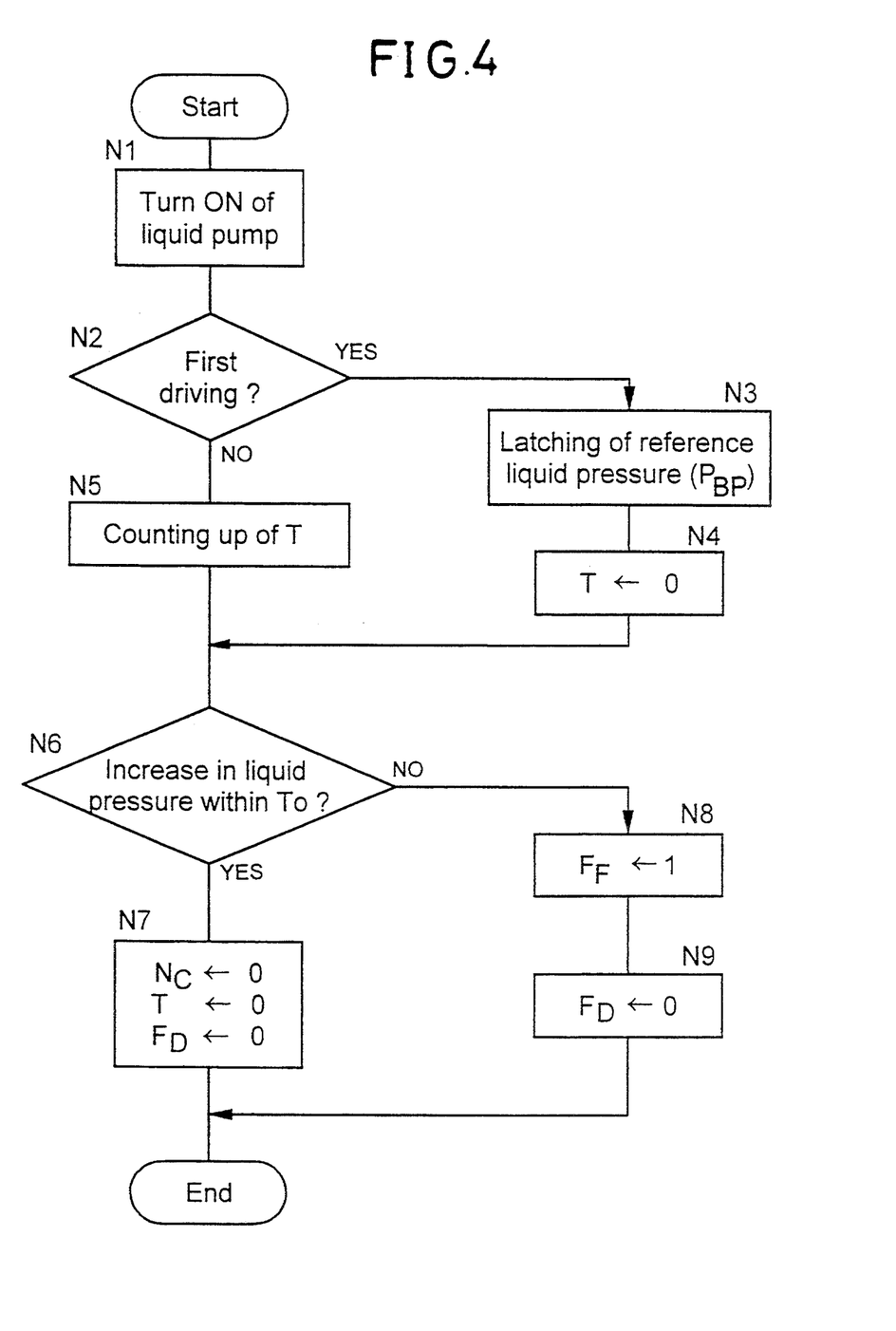
FIG. 4 is a flow chart illustrating a sub-routine for forcedly driving a pump.
Figure 5:
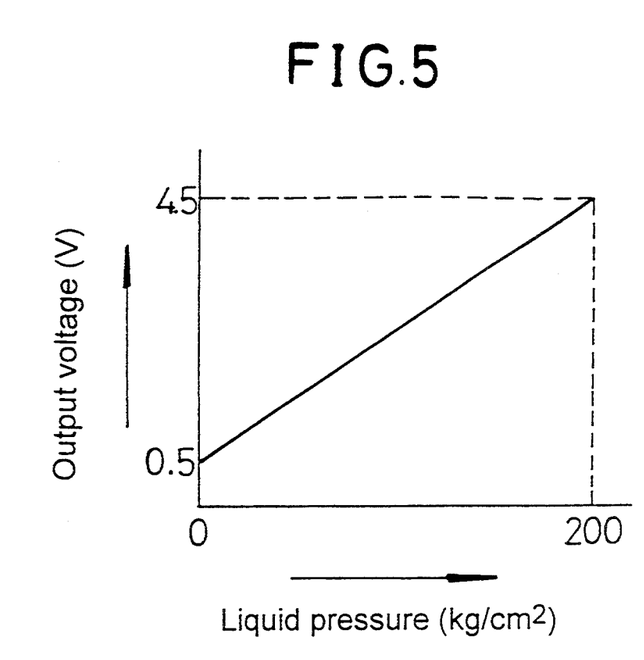
FIG. 5 is a diagram illustrating an output characteristic of a pressure detector.

At the third step S3 in the main routine shown in FIG. 2, a sub-routine shown in FIG. 4 is carried out. At a first step N1 in FIG. 4, the liquid pump 10 is driven irrespective of the detection value detected by the pressure detector 12, and at a second step N2, it is judged whether or not the driving is a first driving. If the driving is a first driving, the now detected liquid pressure value is latched as a second reference liquid pressure $P_{BP}$ at a third step N3, and a timer for counting a driving time for the liquid pump 10 with the flag $F_D$ equal to "1" is reset at a fourth step N4, progressing to a sixth step N6. If it is decided at the second step N2 that the driving is a second or more driving, a time T counted by the timer is counted up, progressing to the sixth step N6.

At the sixth step N6, it is judged whether or not the detected liquid pressure value has been increased by a second predetermined value $\Delta P_2$. e.g., 4 kg/cm² from the second reference liquid Pressure $P_{BF}$, before the time T counted by the timer reaches a preset time $T_0$, e.g., 3 seconds. If it is decided that the detected liquid pressure value P has been increased by the second predetermined value $\Delta P_2$ or more from the second reference liquid Pressure $P_{BF}$ within the preset time $T_0$, the counter and timer are reset, while at the same time, the flag $F_D$ is set at "0", at a seventh step N7.

If it is decided at the sixth step N6 that the variation in detected liquid pressure value P from the second reference liquid pressure $P_{BF}$ within the preset time $T_0$ is less than the second predetermined value $\Delta P_2$, a flag $F_F$ is set at "1" at an eighth step N8 and then, the flag $F_D$ is set at "0".

According to the sub-routine shown in FIG. 4, when the variation in detected liquid pressure value within the preset time $T_0$ from the start of driving of the liquid pump 10 is less than the second predetermined value $\Delta P_2$, it is decided that the pressure detector 12 is out of order and thus, the flag $F_F$ is set at "1".

Returning again to the main-routine shown in FIG. 2, it is judged at a fourth step S4 after implementation of the sub-routine of the second step S2 whether or not the flag $F_F$ is equal to "1". If $F_F=1$, it is judged at a fifth step S5 whether or not it is now immediately after the start, i.e., whether or not it is now immediately after an ignition switch has been turned ON. If it is now immediately after turning-ON of the ignition switch, the processing is advanced to a sixth step S6. If it is decided at the fourth step S4 that $F_F \neq 1$, as well as if it is decided that it is now not immediately after the start, the processing is advanced to a ninth step S9.

At the sixth step S6, the now detected liquid pressure value is latched as a third reference liquid pressure $P_{BC}$. At a next seventh step S7, it is judged whether or not there is a variation in detected liquid pressure value from the third reference liquid pressure $P_{BC}$. If there is a variation in detected liquid pressure value, the flag $F_F$ is set; the counter and timer are reset and further, an alarm lamp (not shown) turned ON at the start, i.e., upon the turning-ON of the ignition switch is turned OFF, all at an eighth step S8. If it is decided at the seventh step S7 that there is no variation in liquid pressure, the processing is advanced to the ninth step S9.

At the ninth step S9, it is diagnosed according to a sub-routine (not shown) whether or not the pressure detector 12 is out of order at a high or low level. More specifically, the output voltage from the pressure detector 12 is determined so that it is 0.5 V, for example, when the liquid pressure is 0 kg/cm$^2$, and it is 4.5 V, for example, when the liquid pressure is 200 kg/cm$^2$. It is diagnosed according to such sub-routine that the pressure detector 12 is out of order, when the output voltage from the pressure detector 12 is less than 0.5 V, or when the output voltage exceeds 4.5 V. If it is decided at a 10th step S10 that trouble has been detected, the alarm lamp is turned ON and at the same time, an error code indicating that the pressure detector 12 is out of order in a high level sticking state is set, at an 11th step S11. This error code is not eliminated even by the turning-OFF of the ignition switch 47.

It is judged at a 12th step S12 after implementation of the sub-routine of the third step S3 whether or not the flag $F_F$ is equal to "1". If $F_F \neq 1$, the processing is advanced to the ninth step S9. If $F_F = 1$, the alarm lamp is turned ON and at the same time, an error code indicating that the pressure detector 12 is out of order, including that the flag $F_F$ is equal to "1", is set at a 13th step This error code is not eliminated even by turning-OFF of the ignition switch.

Figure 6:
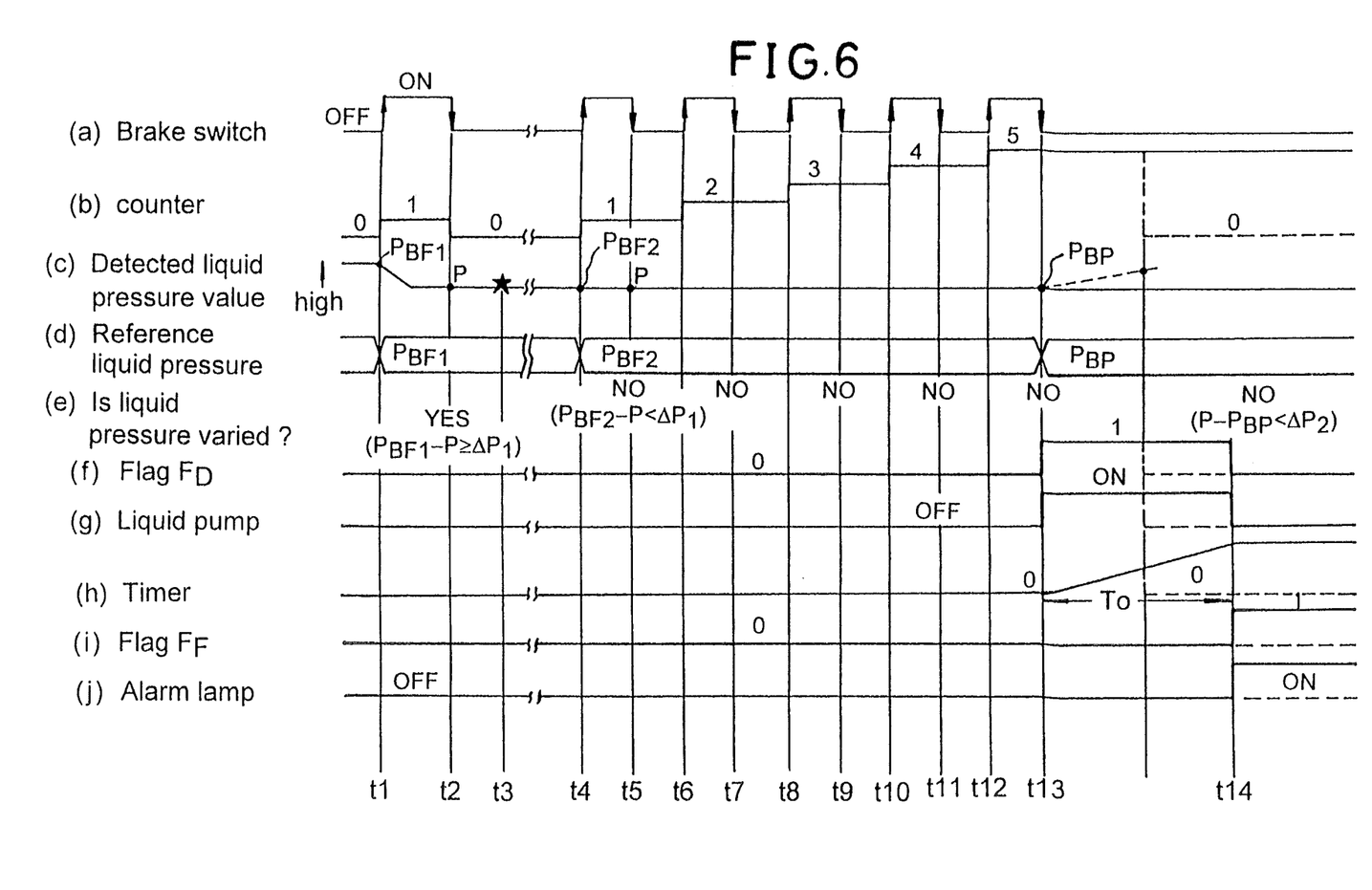
FIG. 6 is a timing chart for judgment of a trouble.

A timing chart according to such a procedure of detecting the trouble of the pressure detector 12 is as shown in FIG. 6. Before, the pressure detector 12 gets out of order, the now detected liquid pressure value is latched as a first reference liquid pressure $P_{BF1}$ at a time point of a braking operation, i.e., at a time point $t_1$, when the output signal from the brake switch 44 is risen, and the detected liquid pressure value P at a time point of the end of the braking operation, i.e., at a time point $t_2$ when the output signal from the brake switch 44 is fallen is compared with the first reference liquid pressure $P_{BF1}$. From the fact that $P_{BF1} - P \geq \Delta P_1$, it is decided that there is a variation in liquid pressure.

Then, when the pressure detector 12 gets out of order at a time Point $t_3$, the now detected liquid pressure value, after the time Point $t_3$, is latched as a first reference liquid pressure $P_{BF2}$ at a time point $t_4$ of the start of the braking operation, and the detected liquid pressure value P is compared with the first reference liquid pressure $P_{BF2}$ at a next time point $t_5$. If $P_{BF2} - P < \Delta P_1$, the count value Nc in the counter becomes "1". Five braking operations all told are carried out from the time point $t_4$ to a time point $t_{13}$. When it is decided that all the results of comparison of the liquid pressures at time points $t_5$, $t_7$, $t_9$, $t_{11}$ and $t_{13}$ of the ends of these braking operations indicate ($P_{BF2} - P < \Delta P_1$) and that there is no variation in liquid pressure, i.e., when the count number Nc in the counter reaches "5", the flag $F_D$ is equal to "1", and the forced driving of the liquid pump 10 is started, while at the same time, the now detected liquid pressure value is latched as a second reference liquid pressure $P_{BP}$, and the counting by the timer is started.

Thereafter, if the variation in detected liquid pressure value P is less than a second predetermined value $\Delta P_2$ even at a time point $t_{14}$ after a lapse of the preset time $T_0$ from the start of the forced driving of the liquid pump 10, the flag $F_D$ is set at "0", and the forced driving of the liquid pump 10 is stopped, while at the same time, the flag $F_F$ is set at "1" and the alarm lamp is turned ON. When the detected liquid pressure value P is increased to a level equal to or more than the second predetermined value $\Delta P_2$ as shown by a dashed line in FIG. 6 before a lapse of the preset time $T_0$, the driving of the liquid pump 10 is stopped at that time point, while at the same time, the counting in the timer is stopped, and the flag $F_F$ remains equal to "0", i.e., the alarm lamp is not turned ON.

Figure 7:
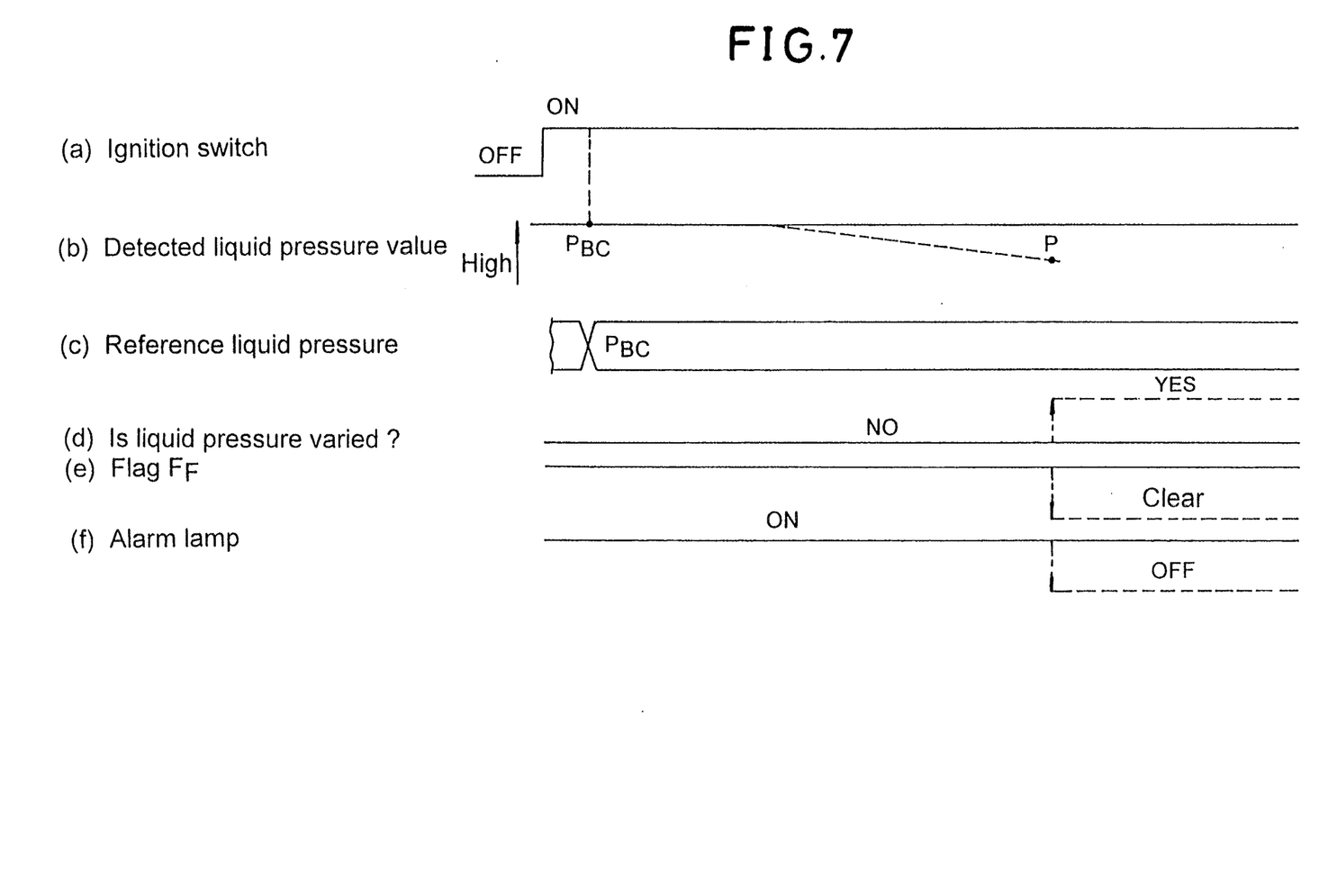
FIG. 7 is a timing chart for judgment of a trouble of the pressure detector at the restart after the decision of the trouble.
Figure 8:
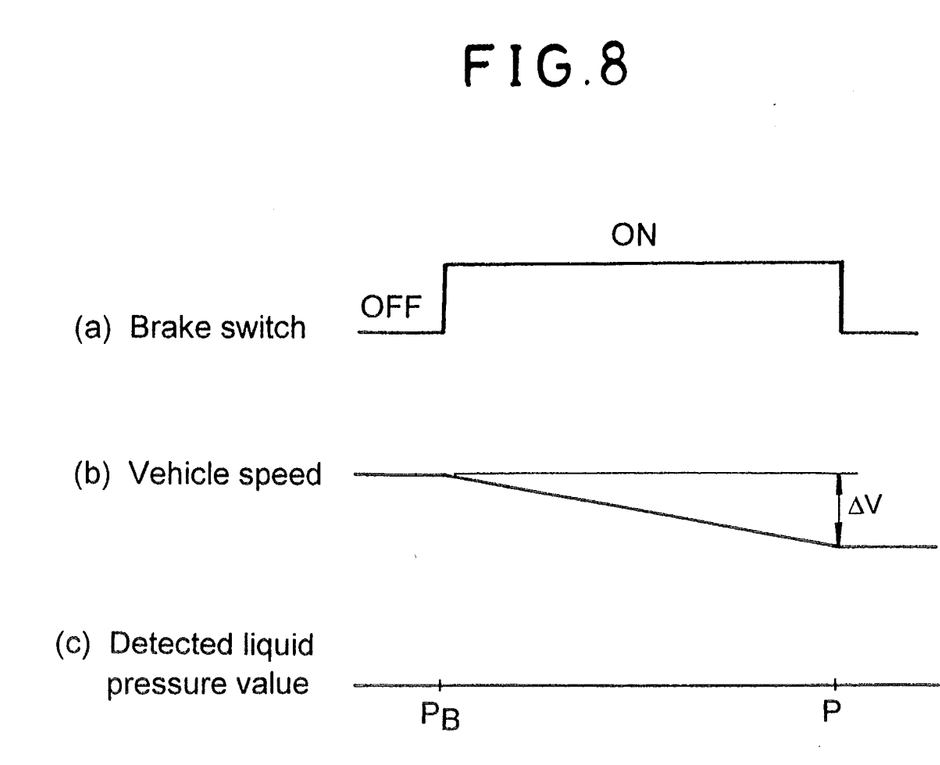
FIG. 8 is a timing chart for judgment of a trouble in a second embodiment.

At the restart after the judgment of the trouble, the flag $F_F$ remains equal to "1", and the alarm lamp also remains turned ON, if the detected liquid pressure value P is not varied relative to a third reference liquid pressure $P_{BC}$, as shown in FIG. 8, immediately after such restart, i.e., immediately after turn-ON of the ignition switch. On the other hand, when the detected liquid pressure value P is varied, as shown by a dashed line in FIG. 7, the flag $F_F$ is set at "0" at that time point, and correspondingly, the alarm lamp is turned OFF.

The operation of the first embodiment will be described below. When the pressure detector 12 is not out of order, i.e., is normal during operation of the liquid pressure brake system when the brake switch is detecting a braking operation, the detection value P detected by the pressure detector 12 is reduced in proportion to the consumption of liquid pressure by the pressure tank 11 in the liquid pressure source 3. When the decrement in such detection value is smaller, it can be decided that the pressure detector 12 is out of order. However, with a driver's foot only put on the brake pedal 1, the brake switch 44 delivers a signal indicative of the fact that the braking operation is being conducted, even if a depression force enough to consume an amount of the liquid pressure is not applied to the brake pedal and hence, the number of braking operations determined on the basis of the output signal from the brake switch is not necessarily proportional to the amount of liquid pressure consumed. Thereupon, when a condition in which the decrement in detection value P detected by the pressure detector 12 for a period in which the brake switch 44 is detecting the braking operation is less than the first predetermined value $\Delta P_1$, is continued five times or more, the liquid pump 10 is forcedly driven. When the decrement in detected liquid pressure value P is less than the second predetermined value $\Delta P_2$ even after a lapse of the preset time $T_0$ from the start of the forced driving of the liquid pump 10, the force driving of the liquid pump 10 is stopped, and the alarm lamp is turned ON.

This ensures that even if the pressure detector 12 is out of order, i.e., has trouble at an intermediate level between high and low levels, such trouble can be detected. On the other hand, when there is a defect in liquid pressure produced in the liquid pressure system even if the pressure detector 12 is normal, the defect in liquid pressure can be detected from the fact that the decrement in liquid pressure is small despite the forced driving of the liquid pressure 10. Therefore, a condition in which the output from the liquid pressure source 3 in the liquid pressure brake system cannot be obtained normally can be reliably detected, and thus, the trouble of the liquid pressure brake system can be informed to a vehicle's driver by turning-ON, i.e., lighting of the alarm lamp or the like. Consequently, it is possible to prevent an occurrence of a situation in which a brake assisting force cannot be obtained in a condition which would not be expected by the driver.

Moreover, when the liquid pump 10 is in operation, the diagnosis of the trouble is not carried out, thereby enabling a prevention of a mis-diagnosis due to a variation in liquid pressure during a usual operation of the liquid pump 10.

Further, if it is decided that there is trouble, it is stored that the liquid pressure brake system is out of order, and an information indicative of such trouble is informed by lighting of the alarm lamp at a next start of the system. For this reason, a situation cannot be produced in which the vehicle driver does not know that the liquid pressure in the liquid pressure source 3 has been reduced abnormally at the start of the system as much as a brake assisting force cannot be obtained.

In the first embodiment, when the variation in output signal from the pressure detector 12 is less than the first predetermined value $\Delta P_1$ during operation of the liquid pressure brake system, the liquid pump 10 is driven irrespective of the output signal from the pressure detector 12. When the variation in output signal from the pressure detector 12 is less than the second predetermined value $\Delta P_2$ as a result of such forced driving, it is decided that the liquid pressure brake system is out of order. Alternatively, a liquid pressure brake system according to a second embodiment of the present invention may be of an arrangement such that when the variation in output signal from the pressure detector 12 is less than a predetermined value in a condition in which the variation in longitudinal vehicle-motion parameter exceeds a preset value during operation of the brake system, it is decided that the liquid pressure brake system is out of order.

More specifically, if a condition in which the variation $\Delta V$ in vehicle speed V (e.g., a vehicle speed based on highest one of speeds of four wheels) is more than, for example, 5 km/hr and moreover, the variation in liquid pressure value ($P_B - P$) detected by the pressure detector is less than a predetermined value, as shown in FIG. 8, is detected continuously five times or more for a period in which the braking operation is being detected by the brake switch, it is decided that the liquid pressure brake system is out of order.

In this second embodiment, when the longitudinal vehicle-motion parameter (e.g., vehicle speed V) is reduced by a predetermined value or more during braking, the liquid pressure is reliably being consumed in the liquid pressure brake system. When the detection liquid pressure value detected by the pressure detector is less than a predetermined value in spite of such a consumption of liquid pressure, it is decided that the liquid pressure brake system is out of order, providing an effect similar to that in the previously-described first embodiment.

Although the embodiments of the present invention have been described in detail, it will be understood that the present invention is not limited to these embodiments, and various modifications in design can be made without departing from the spirit and scope of the invention defined in claims.

For example, in place of the detection of the operation of the system by the brake switch, the detection of the operation of the brake devices $B_{FL}$, $B_{FR}$, $B_{RL}$ and $B_{RR}$ may be relied on, and the present invention is applicable to a negative pressure boosting type brake system comprising a liquid pump functioning as a vacuum pump, and an accumulator constructed to accumulate a negative pressure instead of a positive pressure therein.

What is claimed is

1. A method for detecting trouble in a fluid pressure system comprising a fluid pressure source including a fluid pump, a pressure tank connected to said pump, a pressure detector for detecting a fluid pressure in the fluid tank, and a control means for controlling the operation of the fluid pump on the basis of an output signal from the pressure detector, said system being operated by an output pressure from the fluid pressure source, wherein when an amount of variation in the output signal from the pressure detector is less than a first predetermined value during operation of the fluid pressure system, said fluid pump is forcedly driven regardless of the output signal from the pressure detector, and as a result of such forced driving of the fluid pump, if the amount of variation in the output signal from the pressure detector is less than a second predetermined value, it is decided that there is trouble.

2. A method for detecting trouble in a fluid pressure brake system for a vehicle comprising a fluid pressure source including a fluid pump, a pressure tank connected to said pump, and a pressure detector for detecting a fluid pressure in the pressure tank, and a control means for controlling the operation of the fluid pump on the basis of an output signal from the pressure detector, said system controlling the output pressure from the fluid pressure source to a fluid pressure corresponding to an operation quantity to output the same, wherein when an amount of variation in the output signal from the pressure detector is less than a predetermined value in a condition in which an amount of variation in longitudinal motion parameter of the vehicle exceeds a preset value, during operation of the fluid pressure brake system, it is decided that there is trouble.

* * * * *